(12) United States Patent
Shirakata et al.

(10) Patent No.: US 8,643,234 B2
(45) Date of Patent: Feb. 4, 2014

(54) ELECTRICAL ROTATING MACHINE

(75) Inventors: Yuji Shirakata, Chiyoda-ku (JP);
Masao Kikuchi, Chiyoda-ku (JP);
Masahiko Fujita, Chiyoda-ku (JP);
Hitoshi Isoda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 843 days.

(21) Appl. No.: 12/610,647

(22) Filed: Nov. 2, 2009

(65) Prior Publication Data

US 2010/0301692 A1  Dec. 2, 2010

(30) Foreign Application Priority Data

May 28, 2009 (JP) ................................. 2009-128382

(51) Int. Cl.
*H02K 9/06* (2006.01)
*H02K 9/28* (2006.01)

(52) U.S. Cl.
USPC .................... 310/63; 310/64; 310/71; 310/89

(58) Field of Classification Search
USPC ............................... 310/64, 71, 68 D, 89, 63
See application file for complete search history.

(56) References Cited

U.S. PATENT DOCUMENTS

| 7,638,910 | B2 | 12/2009 | Akita et al. | |
|---|---|---|---|---|
| 2007/0045037 | A1* | 3/2007 | Yoshinari et al. | 180/444 |
| 2007/0257568 | A1 | 11/2007 | Akita et al. | |
| 2008/0197726 | A1 | 8/2008 | Dubuc et al. | |
| 2008/0216699 | A1* | 9/2008 | McAleer et al. | 102/367 |

FOREIGN PATENT DOCUMENTS

| JP | 2004-274992 A | 9/2004 |
|---|---|---|
| JP | 2005/224044 A | 8/2005 |
| JP | 2006/211835 A | 8/2006 |
| JP | 2008-543262 A | 11/2008 |

* cited by examiner

*Primary Examiner* — Tran Nguyen
*Assistant Examiner* — David Scheuermann
(74) *Attorney, Agent, or Firm* — Sughrue Mion, PLLC

(57) ABSTRACT

An object of the present invention is to provide an electrical rotating machine capable of securing safety against collision. Included are a rotor having a field winding and cooling fans, and a stator having a stator winding, arranged so as to surround the rotor. A bracket 1 is fixed to a load side end of the stator, and a heat sink is disposed inside the bracket. On the anti-load side of the heat sink, a field circuit unit and power circuit units for controlling the field winding and the stator winding, respectively, are mounted, whereas on the load side thereof, cooling fins are disposed. The anti-load side and lateral side of the field circuit unit and the power circuit units are surrounded by the bracket. Accordingly, a whole of the field circuit unit and the power circuit units is surrounded by the bracket and the heat sink.

11 Claims, 8 Drawing Sheets

ELECTRICAL ROTATING MACHINE

BACKGROUND OF THE INVENTION

1. Field of the Invention

The present invention relates to an electrical rotating machine, and more particularly to an electrical rotating machine, for use in a vehicle, having a motor generator and a control section structured in an integrated manner.

2. Description of the Background Art

Conventionally, there has been an electrical rotating machine, in which: switching elements constituting a part of an inverter are fixed onto a bottom plate of an inverter case; the bottom plate constitutes a heat sink of the switching elements; and a resin cover is provided on the external side of the heat sink (see FIG. 1 of Japanese Patent No. 4123436, hereinafter referred to as Patent Document 1).

Additionally there has been disclosed an assembly of electronic components for an electrical rotating machine in which a heat sink, an electronic module, a signal interconnection piece, and a power interconnection piece are disposed outside a bracket in a layered manner, and are entirely covered with a cover (see Japanese Unexamined Patent Application Publication No. 2008-543262, hereinafter referred to as Patent Document 2).

In the case of the electrical rotating machine having the motor generator and the control section structured in an integrated manner, the control section needs to be protected mechanically as well as electrically. Particularly, when the control section is arranged outside a bracket, safety measures against collision needs to be devised, and to secure safety at the time of collision, a reinforced cover or the like is required to cover the inverter section. In above Patent Document 1, although the cover and the heat sink are provided, there is no switching element provided between the cover and the heat sink, which causes a problem of insufficient strength.

Further, the components disclosed in above Patent Document 2 are merely covered with a resin or metal cover, and the cover is not as strong as a bracket. Thus, to secure safety against collision, the cover needs to be made thicker, or the material of the cover needs to be changed, for example.

SUMMARY OF THE INVENTION

The present invention has been made to solve the above problems, and an object of the present invention is to provide an electrical rotating machine capable of securing safety against collision.

The electrical rotating machine according to the present invention includes a rotor having a field winding, a stator having a stator winding, arranged so as to surround the rotor, a bracket fixed to a load side end of the stator, and a heat sink which is disposed inside the bracket, and has mounted on an anti-load side thereof a field circuit unit and power circuit units for controlling the field winding and the stator winding, respectively, and has cooling fins disposed on a load side thereof. The bracket is arranged so as to surround an anti-load side and a lateral side of the field circuit unit and the power circuit units, and a whole of the field circuit unit and the power circuit units is surrounded by the bracket and the heat sink.

The electrical rotating machine according to the present invention includes the rotor having the field winding, the stator having the stator winding, arranged so as to surround the rotor, the bracket fixed to the load side end of the stator, and the heat sink which is disposed inside the bracket, and has mounted on the anti-load side thereof the field circuit unit and the power circuit units for controlling the field winding and the stator winding, respectively, and has the cooling fins disposed on the load side thereof. The bracket is arranged so as to surround the anti-load side and the lateral side of the field circuit unit and the power circuit units, and thus the whole of the field circuit unit and the power circuit units is surrounded by the bracket and the heat sink, whereby it is possible to secure safety of the field circuit unit and the power circuit units against collision.

The foregoing and other objects, features, aspects and advantages of the present invention will become more apparent from the following detailed description of the present invention when read in conjunction with the accompanying drawings.

DETAILED DESCRIPTION OF THE PREFERRED EMBODIMENTS OF THE INVENTION

First Embodiment

Figure 1:
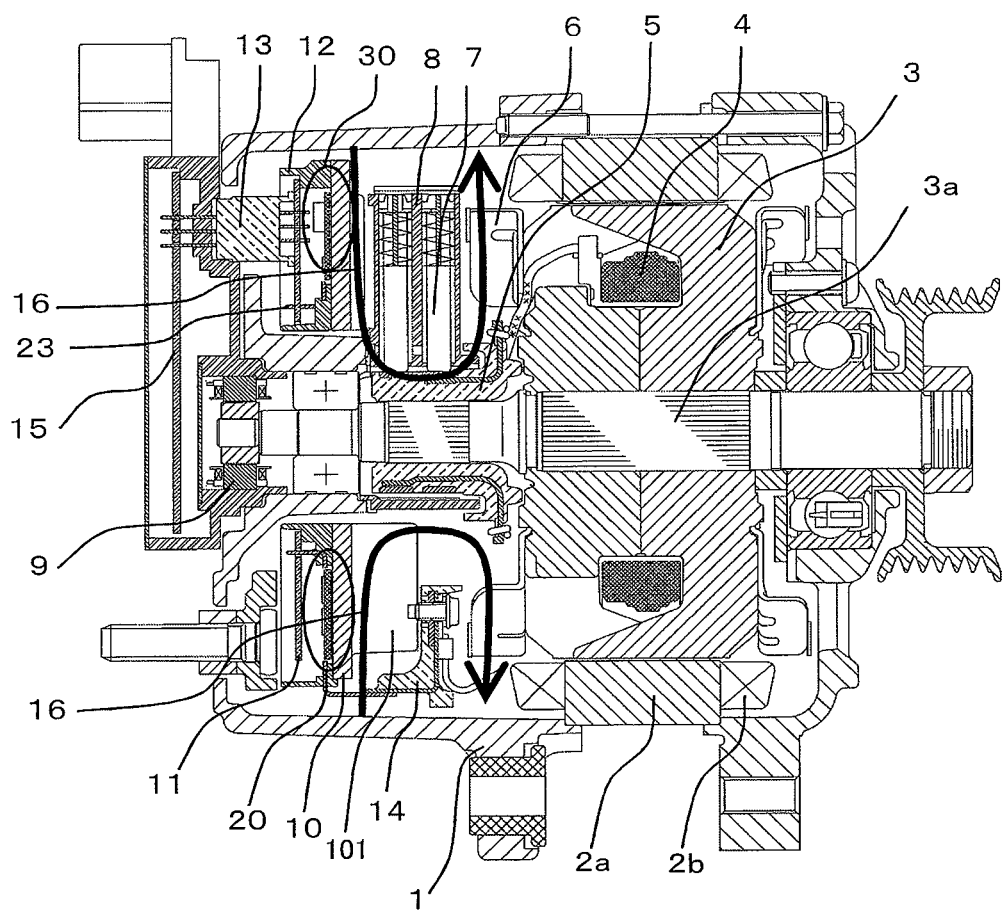
FIG. 1 is a lateral cross-sectional view of an electrical rotating machine according to a first embodiment of the present invention.
Figure 2:
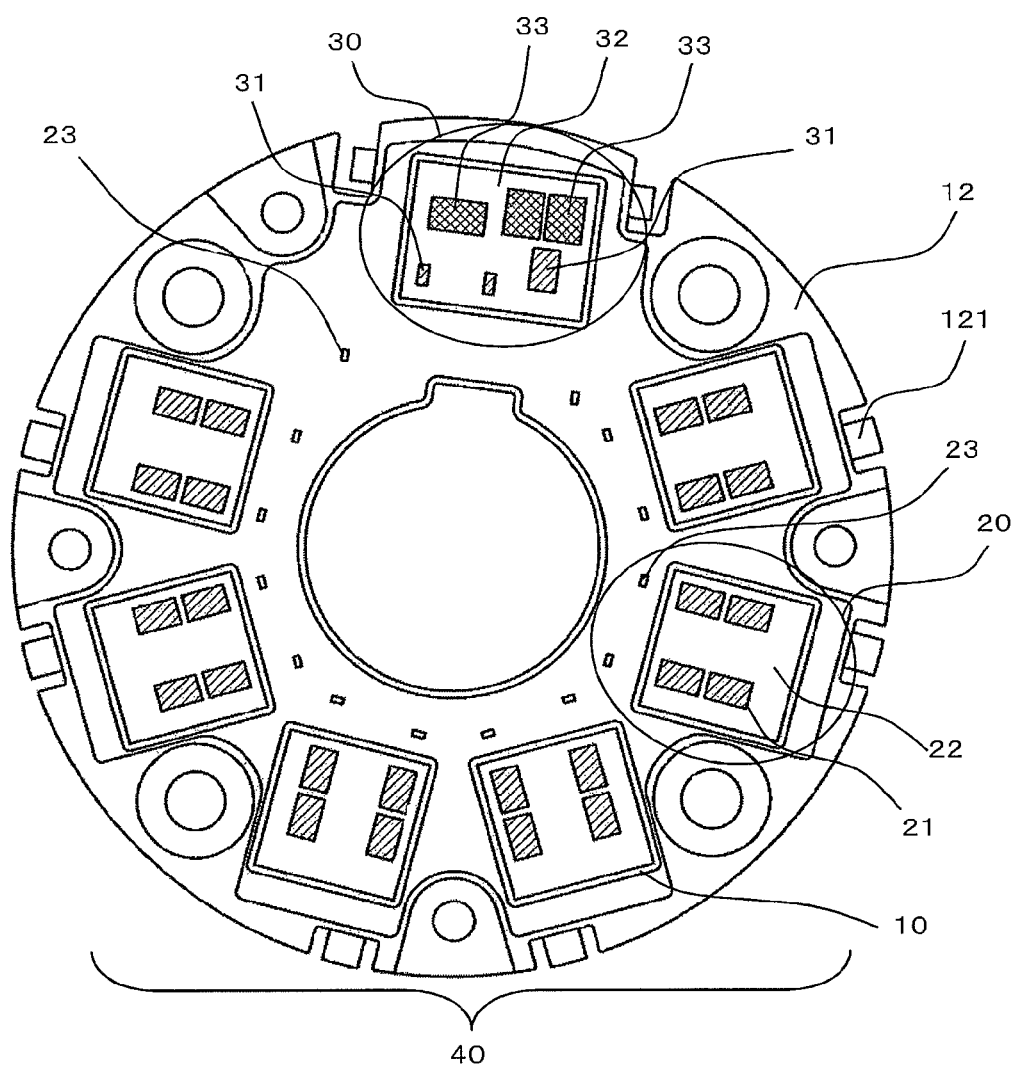
FIG. 2 is a plan view of an electronic module.
Figure 3:
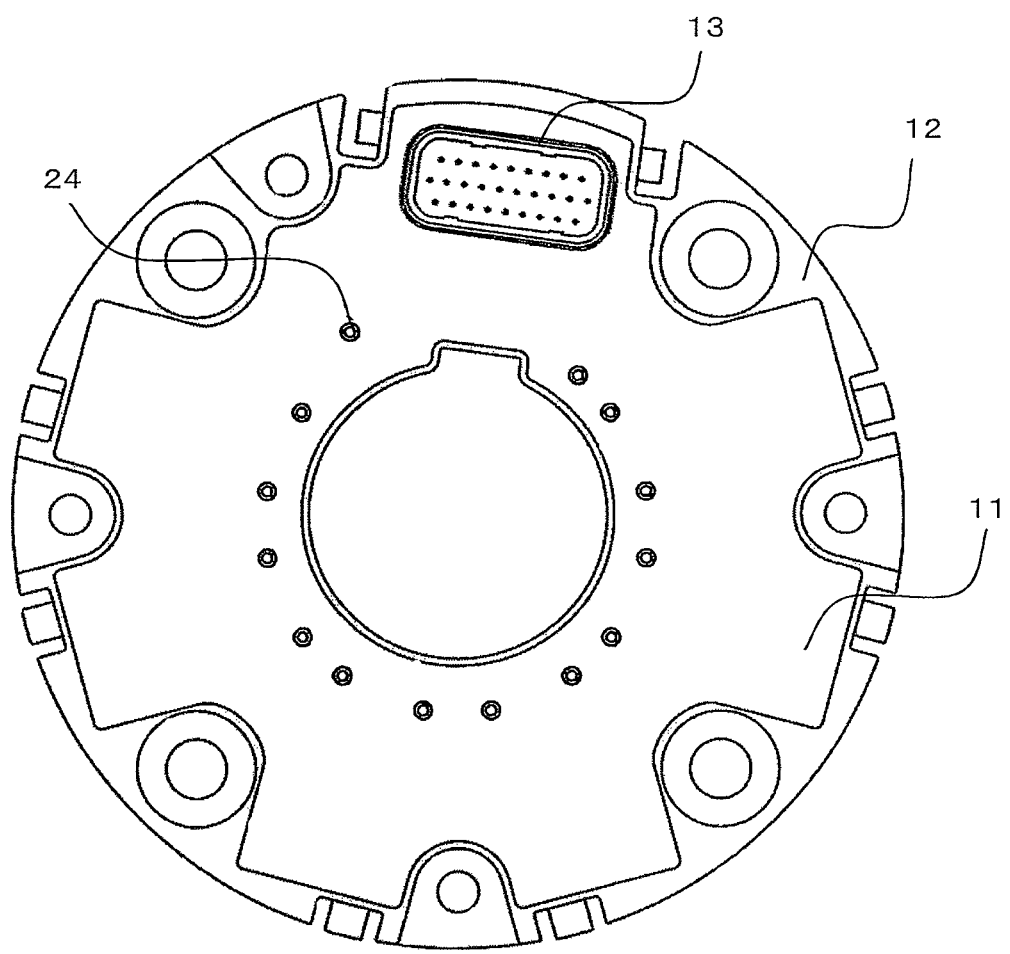
FIG. 3 is a plan view of a relay board.
Figure 4:
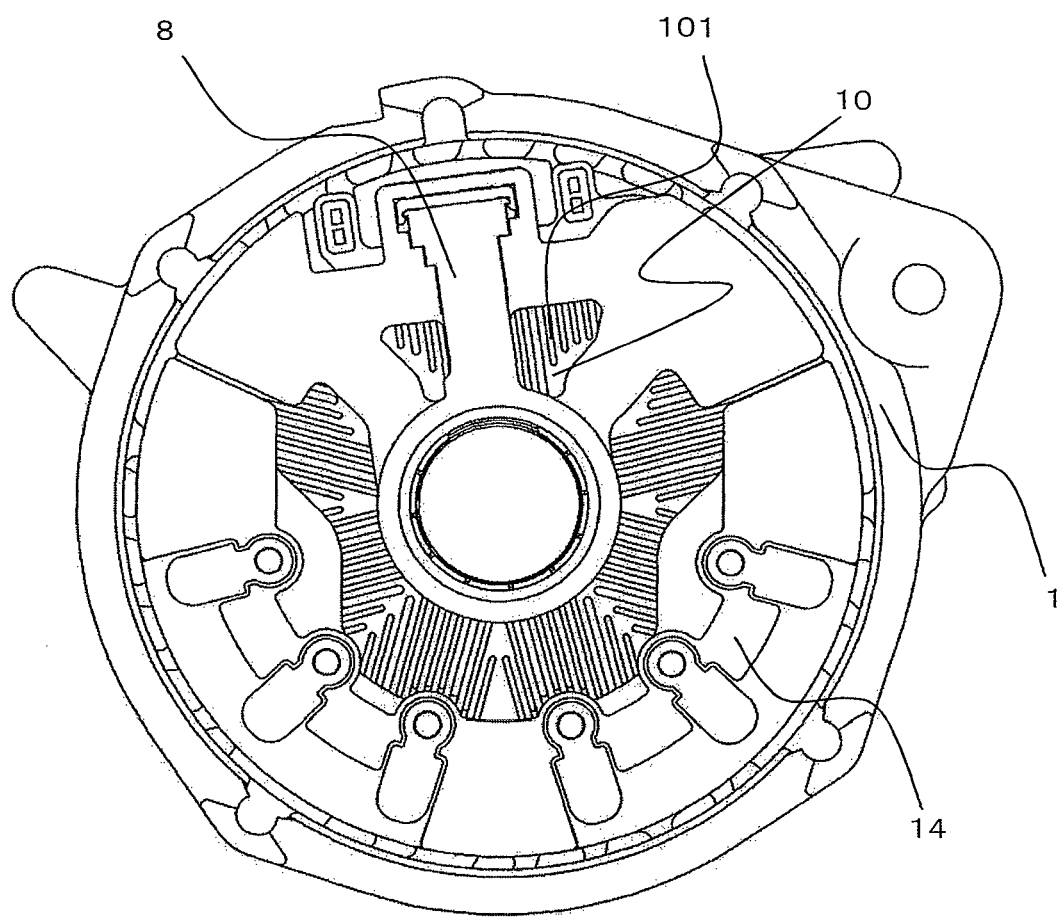
FIG. 4 is a plan view showing a wiring member and a brush holder, which are disposed in a bracket, as viewed from a stator side.

Hereinafter, an embodiment of the invention will be described with reference to drawings. FIG. 1 is a lateral cross-sectional view of an electrical rotating machine according to a first embodiment of the present invention. FIG. 2 is a plan view of an electronic module. FIG. 3 is a plan view of a relay board. FIG. 4 is a plan view showing a wiring member and a brush holder, which are disposed in a bracket, as viewed from a stator side.

In the drawings, a stator 2a is supported by a load side end part of a bracket 1, and has a stator winding 2b wound therearound. Inside the stator 2a, a rotor 3 is disposed coaxially with the stator 2a, and the rotor 3 is provided with a field winding 4 for generating a magnetomotive force, a shaft 3a, and a slip ring 5. Further, cooling fans 6 are fixed at an anti-load side end of the rotor 3.

Provided inside the bracket 1 are: a brush holder 8 which is in contact with the slip ring 5 and holds a brush 7 for supplying a current to the field winding 4; a wiring member 14; a disc-shaped heat sink 10 having a hole portion formed therein; power circuit units 20 for supplying alternating-current power to the stator winding 2b; a field circuit unit 30 for supplying a current to the field winding 4; and a case 12 having terminals, such as signal wires, insert-molded. A resolver 9 for detecting angles and a control board 15 are provided on the rear side of the bracket 1.

The power circuit units 20 and the field circuit unit 30 are joined onto a common plane surface, on the anti-load side, of the heat sink 10, and the case 12 having inserted thereto signal terminals 23 or the like of the power circuit units 20 and the field circuit unit 30 is also joined thereonto so as to surround the power circuit units 20 and the field circuit unit 30. A relay board 11 collectively accommodating the respective signal terminals 23 is arranged, and then the inside of the case 12 is sealed with resin, whereby an electronic module 40 is structured.

As shown in FIG. 2, the power circuit unit 20 is structured by having power-circuit semiconductor switching elements 21 for supplying a current to the stator winding 2b, and a circuit board 22 having mounted thereon the semiconductor switching elements 21, and by joining the circuit board 22 onto the disc-shaped heat sink 10. The field circuit unit 30 is structured by joining, on the heat sink 10, a circuit board 32 which has mounted thereon magnetic field semiconductor switching elements 31 for supplying a current to the field winding 4 and electronic components 33 such as a capacitor.

A ceramic substrate is used for the circuit boards 22 and 32. The semiconductor switching elements 21 and 31, which are composed of a MOSFET or the like, are mounted on the circuit board 22 and 32, respectively. The semiconductor switching elements 21 and 31 are connected to the signal terminals 23, which are insert-molded to the case 12, by means of wire bonding (not shown). Described here is the case where the ceramic substrate is used for the circuit boards 22 and 32. In order to improve durability against collision, a thickness of the board needs to be 0.3 mm or more when the board is formed of Si3N4. Further, when the board is formed of ALN (aluminum nitride), the thickness of the board needs to be 0.6 mm or more in order to secure a similar level of durability.

The power circuit units 20 and the field circuit unit 30 are joined onto a common heat sink 10, whereby the number of signal terminals 23 for control use is increased. Further, the signal terminals 23 need to be connected to the control board 15 disposed outside the bracket 1, however, the signal terminals 23 are located in the electronic module 40 in a scattered manner, it will be difficult to connect the same to the control board 15 without arranging anything therebetween.

Thus, as shown in FIG. 3, the relay board 11 provided with signal terminal connection sections 24 is arranged, and the signal terminals 23 located inside the electronic module 40 in a scattered manner are connected to and collectively accommodated in the signal terminal connection sections 24. Further, the relay board 11 is connected to the control board 15 via the connector 13 or the like. The electronic module 40 is accommodated in the bracket 1, and an anti-load side surface and a lateral side surface of the electronic module 40 are surrounded by the bracket 1.

The resolver 9 and the control board 15 are disposed outside the bracket 1, and the control board 15 and the electronic module 40 are connected via the connector 13 or the like having the bracket 1 interposed therebetween. The heat sink 10 has a disc shape having a hole portion formed therein. On a surface (on the load side) opposite to the surface (on the anti-load side) that has mounted thereon the power circuit units 20 and the field circuit unit 30, cooling fins 101 are disposed.

Since the control board 15 is arranged outside the bracket 1, the electronic module 40 and the control board 15 are isolated from each other by the strong bracket 1, whereby it is possible to prevent the electronic module 40 and the control board 15 from being deformed and short-circuited. Further, even in the case where the shape or the specification of the control board 15 is changed due to a model change or the like, such a change may be easily overcome by changing only a structure outside the bracket 1. Further, since the bracket 1 functions as a shield, a noise transmitted from the electronic module 40 to the control board 15 can be reduced.

The bracket 1 is formed in a cylindrical shape, and the heat sink 10 is formed in a disc shape having a hole portion formed therein. Accordingly, it is possible to effectively utilize a space inside the bracket 1 for arranging components, and also possible to maximize the size of the heat sink 10. As a result, it is possible to secure enough space for arranging the power circuit units 20 and the field circuit unit 30, and also secure enough space for arranging the cooling fins 101.

The brush holder 8 is fixed on the heat sink 10, and is fixed on a rear surface of the field circuit unit 30. At a portion where the brush holder 8 is fixed, the height of the cooling fins 101 is set lower than that of the cooling fins 101 disposed at the remaining portion such that the brush holder 8 is fixed in place. Further, the field circuit unit 30 and the brush holder 8 are connected to each other via a connection terminal 121 which is insert-molded to the case 12.

The height of the cooling fins 101 disposed at a position on the rear surface side (load side) of the field circuit unit 30 is lowered. However, the heat sink 10 is also used for the power circuit units 20 in a shared manner, and the heat is spread all over the heat sink 10. Accordingly, even if the height of the cooling fins 101 at the above-described position is lowered, it is not the case that the temperature of only the field circuit unit 30 is increased.

As shown in FIG. 4, on a rear surface side (load side) of the heat sink 10, not only the brush holder 8, but also the wiring members 14 are connected. By means of the wiring members 14, the stator winding 2b is connected to the power circuit units 20 provided in the electronic module 40. Supposing that the stator winding 2b is connected to the power circuit units 20 without using the wiring members 14, when wiring fixing positions are misaligned between the stator winding 2b and the power circuit units 20 in the circumferential direction, connection therebetween cannot be achieved as they are. Particularly, it is often the case that the position of a coil end is changed due to a change in the specification of the winding. Even in such a case, with the use of the wiring members 14, wiring can be extended to reach the respective fixing positions, and the stator winding 2b and the power circuit units 20 can be easily connected to each other.

Accordingly, it is possible to design and fix the stator 2a and the electronic module 40 without having to carefully consider the wiring position. Further, since the wiring members 14 are arranged between the heat sink 10 and the stator 2a, wiring can be performed adaptively in the case of connecting the stator winding 2b and the electronic module 40.

Further, in addition to the arrangement of the wiring members 14 and the brush holder 8 in between the heat sink 10 and the cooling fans 6, holes are arranged on some portions of the bracket, that is, on an outer circumference thereof, in a radial direction of the heat sink 10, the wiring members 14 and the brush holder 8, so as to allow a cooling air to pass therethrough, whereby cooling air paths 16 (paths indicated by arrows in FIG. 1) to cool the heat sink 10, the wiring members 14, and the brush holder 8 are formed (although holes are not shown in FIG. 1, holes are arranged on the bracket 1 circumferentially). In the above description, a case where holes are arranged on the bracket 1 has been described, however, the holes are not necessarily required.

Further, to interfere with stress to the connection terminal 121, a bent portion is provided thereto, whereby vibration is absorbed, and vibration resistance can be improved. Additionally, a slip ring 5 and the brush holder 8 are arranged between the heat sink 10 and the stator 2a, whereby it is possible to prevent a short-circuit from being caused by collusion between the electronic module 40, and the slip ring 5 or the brush holder 8.

The electronic module 40 is arranged inside the bracket 1 such that the anti-load side and lateral side of the electronic module 40 are surrounded by the bracket 1. Further, on the load side of the electronic module 40, the heat sink 10 is fixed. With such a configuration, the electronic module 40 is entirely surrounded by the bracket 1 and the heat sink 10. Accordingly, even when the bracket 1 is deformed inwardly at the time of collision, the heat sink 10 functions as a barrier to protect the electronic module 40, and thus the safety against collision can be improved.

Figure 5:
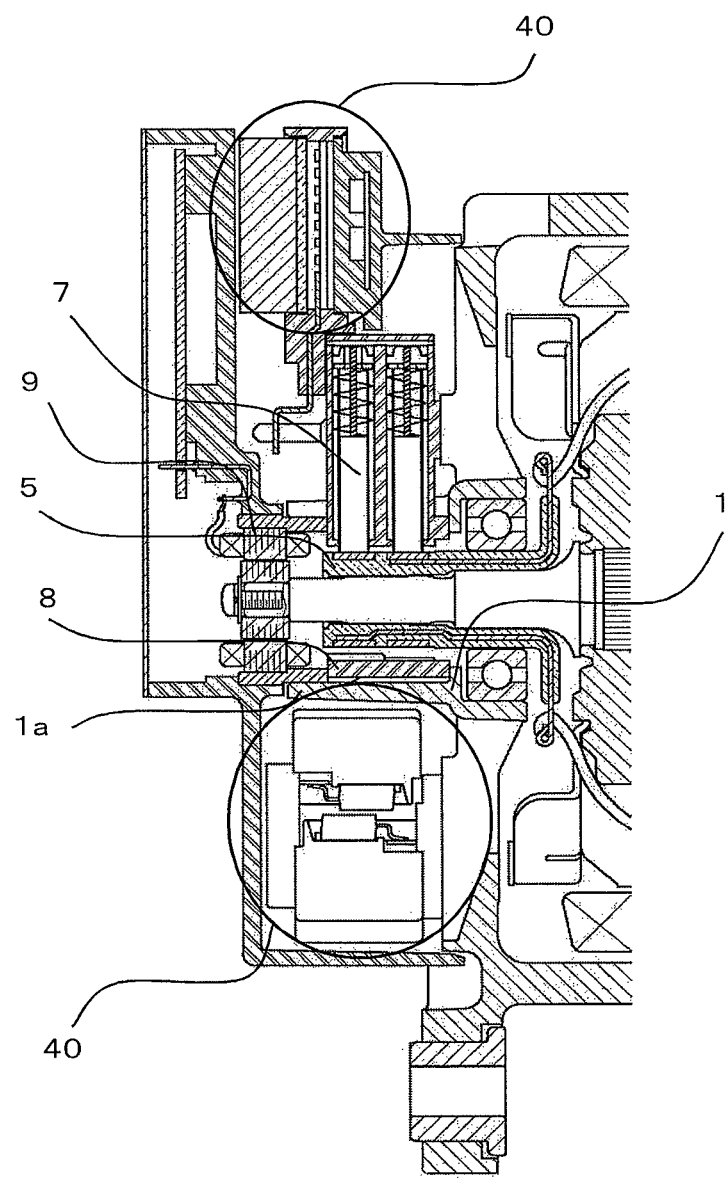
FIG. 5 is a cross-sectional view showing a state where an electronic module is disposed outside the bracket.

Further, as shown in FIG. 5, when the electronic module 40 is arranged outside the bracket 1, a wall 1a extending from the bracket 1, for supporting a resolver 9, covers the slip ring 5 entirely, and consequently, it is difficult to form a cooling air path. On the other hand, according to the present invention, the electronic module 40 is arranged inside the bracket 1, whereby the wall for supporting the resolver 9 need not be fixed in a manner to surround the slip rings. Accordingly, the cooling air paths 16 for cooling the electronic module 40 pass close to the slip ring 5, which improves cooling performance.

The cooling air path 16 for the field circuit unit 30 is created with the wiring members 14 as well as the brush holder 8, and also cools the brush 7 and the brush holder 8. As described above, according to the present invention, it is possible to improve the safety of the electronic module 40 against collision. Further, with the cooling air path 16, it is possible to efficiently cool not only the heat sink 10, but also the slip ring 5, the brush 7, the brush holder 8, and the wiring members 14.

Further, the control board 15 is arranged outside the bracket 1, and accordingly, the winding section such as the stator 2a and the rotor 3 are arranged separated from the control board 15, whereby even in the case where the shape and the specification of the control section is changed due to a model change or the like, such a change can be easily managed by changing only the structure outside the bracket 1, such as the control board 15.

Further, even in the case where the shape and the specification such as the number of turns of the winding section, the position of the coil end, and the like are changed, such a change can be easily managed by changing only the winding section. Further, with the use of the wiring members 14, it is possible to manage a case where the connection positions of the electronic module 40 and the winding section are changed. Accordingly, delivery period can be shortened, and manufacturing costs can be reduced.

Second Embodiment

Figure 6:
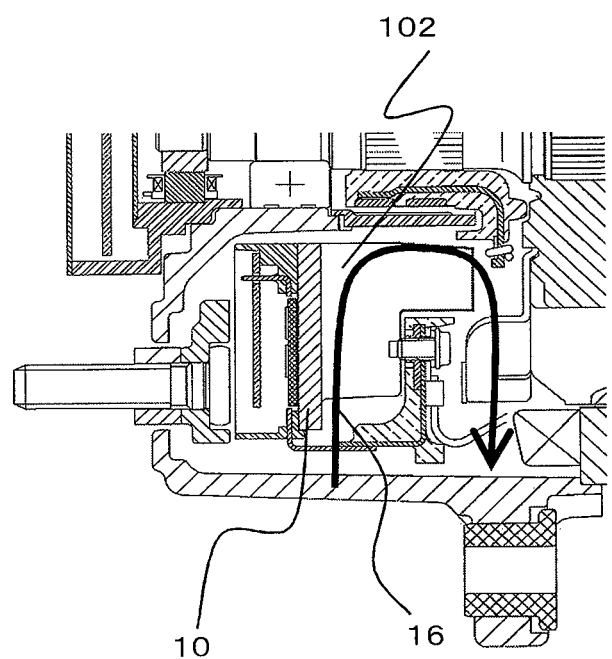
FIG. 6 is a cross-sectional view showing a part of an electrical rotating machine according to a second embodiment of the present invention.

FIG. 6 is a cross-sectional view showing a portion of an electrical rotating machine according to a second embodiment of the present invention. Regarding the electrical rotating machine according to the first embodiment, the case has been described where the height of the cooling fins 101 provided to the heat sink 10 is constant regardless of the position, either on the inner circumference side or on the outer circumference side. However, the height of the cooling fins may be changed depending on the position, either on the outer circumference side or on the inner circumference side. Namely, as shown in FIG. 6, when the height of cooling fins 102 on the inner circumference side is set higher than the height thereof on the outer circumference side, the section modulus of the cooling fins on the inner circumference side is increased, whereby the strength of a heat sink 10 can be increased. Further, it is possible to increase the area of the cooling fins, the area having contact with the cooling air passing through cooling air paths 16, and accordingly, the cooling performance can be increased.

An electronic module 40 is disposed inside the bracket 1, and a brush holder 8 and wiring members 14 are connected to the heat sink 10. The brush holder 8 and the wiring members 14 each has a surface facing a stator 2a, in addition to their original functions. Further, cooling fans 6 are fixed on the anti-load side end of a rotor 3. Accordingly, the cooling air paths 16 are formed with these components. As shown in FIG. 4, the wiring member 14 has a horseshoe shape arranged circumferentially, and has an opening on the inner circumference side so as to form the cooling air paths 16. As shown in FIG. 6, in the opening portion, the cooling fins 102 are partially set higher so as to make the height of the cooling fin on the inner circumference side higher than that on the outer circumference side.

Figure 7:
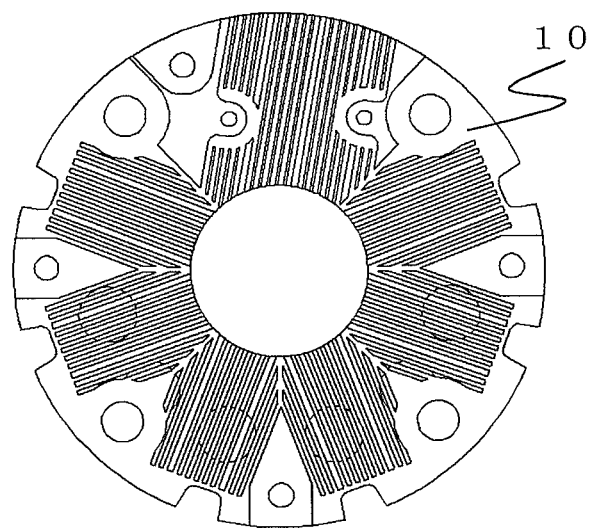
FIG. 7 is a plan view showing a rear surface of a heat sink.
Figure 8:
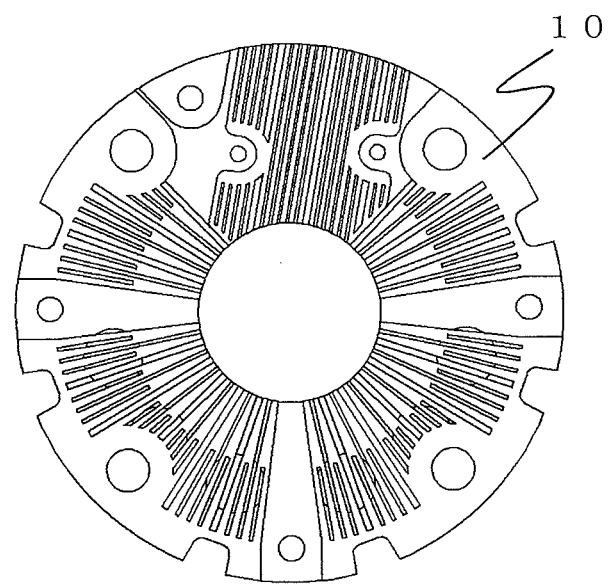
FIG. 8 is a plan view showing a rear surface of a heat sink.

Further, the cooling air paths 16 are adjustable by changing the size of the opening. However, the height of the cooling fins situated at and around the brush holder 8 cannot be set high even on the inner circumference side due to presence of the brush holder 8. Further, as shown in FIG. 7, the cooling fins 101 and 102 may be arranged on the rear surface of the heat sink 10 having power circuit units 20 and a field circuit unit 30 mounted thereon, so as to correspond to positions at which the power circuit units 20 and the field circuit unit 30 are mounted, and may extend in parallel to one another. Alternatively, as shown in FIG. 8, the cooling fins may be arranged radially to extend toward the inner circumference side. The cooling fins arranged in parallel with one another may have larger area than the cooling fins arranged radially, and thus has higher cooling performance.

According to the present embodiment, the height of the cooling fins 102 on the inner circumference side is set higher than those on the outer circumference side, and accordingly, the strength of the heat sink 10 can be improved. Further, it is possible to increase a contact area of the cooling fins with the cooling air flowing through the cooling air paths 16, and accordingly, the cooling performance can be improved.

Embodiment 3

Figure 9:
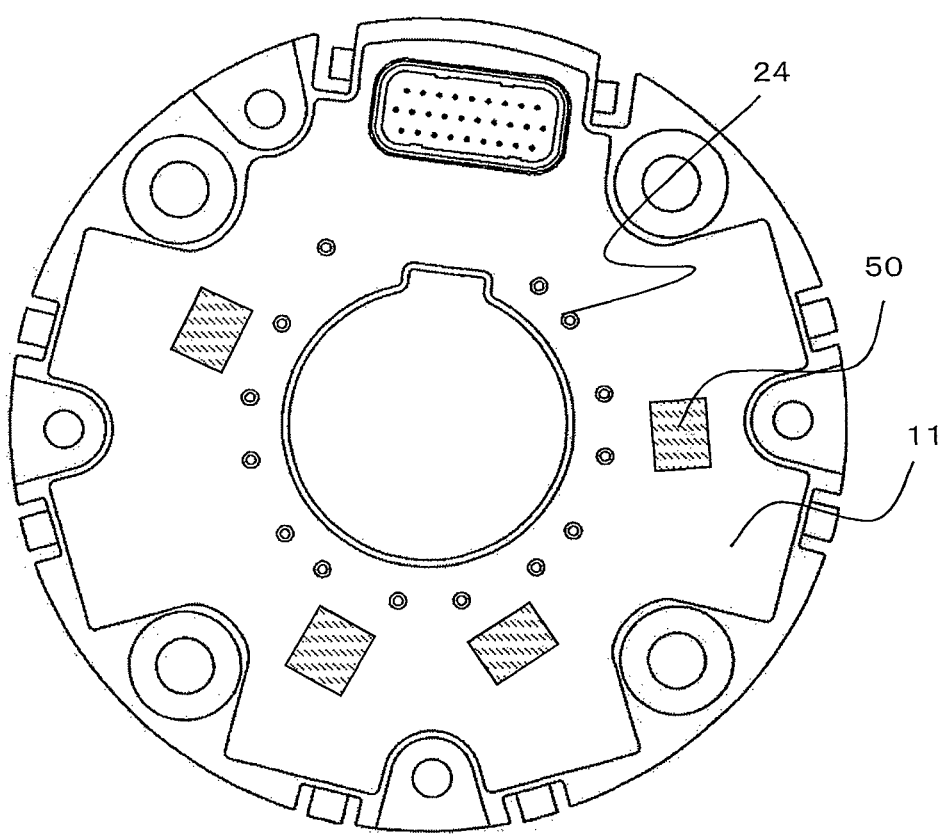
FIG. 9 is a plan view of an electronic module of an electrical rotating machine according to a third embodiment of the present invention.

FIG. 9 is a plan view showing an electronic module of an electrical rotating machine according to a third embodiment of the present invention. In the present embodiment, electronic components 50 which are less shock-resistant are mounted on the inner circumference side of a relay board 11, whereby damage to the electronic components 50 at the time of collision is reduced. Further, a space inside a bracket 1 can be utilized effectively, the electrical rotating machine can be downsized overall, and the energy consumption can be minimized. An electronic module 40 has a configuration in which: power circuit units 20, a field circuit unit 30, and a case 12 are joined onto a heat sink 10; the relay board 11 is arranged; and then the components are sealed with resin.

In the relay board 11, signal terminals 23 of the power circuit units 20 and the field circuit unit 30 are connected to signal terminal connection sections 24. However, as shown in FIG. 9, the electronic components 50 or the like may be arranged on the relay board 11. Particularly, by arranging the electronic components 50 on the relay board 11, the electronic components 50 being to be arranged in the vicinity of the power circuit units 20 and the field circuit unit 30, the space can be utilized effectively, and downsizing can be achieved.

According to the present embodiment, the electronic components 50 are arranged on the inner circumference side of the relay board 11, whereby damage to the electronic components 50 at the time of collision can be reduced. Further, the space can be utilized effectively, and the electrical rotating machine can be downsized overall.

Various modifications and alterations of this invention will be apparent to those skilled in the art without departing from the scope and spirit of this invention, and it should be understood that this is not limited to illustrative embodiments set forth herein.

What is claimed is:

1. An electrical rotating machine comprising:
a rotor having a field winding;
a stator having a stator winding, arranged so as to surround the rotor;
a bracket fixed to a load side end of the stator; and
a heat sink which is disposed inside the bracket, and has mounted on an anti-load side thereof a field circuit unit and power circuit units for controlling the field winding and the stator winding, respectively, and has cooling fins disposed on a load side thereof, wherein
the bracket is arranged so as to surround an anti-load side and a lateral side of the field circuit unit and the power circuit units, and a whole of the field circuit unit and the power circuit units is surrounded by the bracket and the heat sink,
wherein wiring members for connecting the stator winding and the power circuit units, a slip ring, and a brush holder are arranged between the load side of the heat sink and the stator,
wherein cooling fans are arranged at an anti-load side end of the rotor to form cooling air paths for cooling the heat sink, the wiring members, the slip ring, and the brush holder, and
wherein the cooling air path for the field circuit unit is created with the wiring members and the brush holder.

2. The electrical rotating machine according to claim 1, wherein a relay board for collectively accommodating signal terminals of the field circuit unit and the power circuit units is arranged on the anti-load side of the field circuit unit and the power circuit units, and the relay board is connected to a control board disposed outside the bracket via a connector.

3. The electrical rotating machine according to claim 2, wherein electronic components that are less shock-resistant are mounted on the relay board.

4. The electrical rotating machine according to claim 1, wherein the cooling fins are formed such that the height thereof on an inner circumference side of the electrical rotating machine is higher than the height thereof on an outer circumference side.

5. The electrical rotating machine according to claim 1, wherein the heat sink is formed in a disc shape having a hole portion formed therein.

6. The electrical rotating machine according to claim 1, wherein at least one of the field circuit unit and the power circuit units includes a circuit board formed of silicon nitride and having a thickness of at least 0.3 mm.

7. The electrical rotating machine according to claim 1, wherein at least one of the field circuit unit and the power circuit units includes a circuit board formed of aluminum nitride and having a thickness of at least 0.6 mm.

8. The electrical rotating machine according to claim 1, wherein holes are arranged on an outer circumference of the bracket.

9. The electrical rotating machine according to claim 1, wherein the cooling fins are arranged on a rear surface of the heat sink so as to correspond to positions at which the power circuit units and the field circuit unit are mounted.

10. The electrical rotating machine according to claim 9, wherein the cooling fins extend in parallel to one another.

11. The electrical rotating machine according to claim 1, wherein the cooling fins are arranged radially to extend toward an inner circumference side of the electrical rotating machine.

* * * * *